(12) United States Patent
Prabhakar (10) Patent No.: US 11,089,205 B2
(45) Date of Patent: Aug. 10, 2021

(54) WINDOW POSITION MONITORING SYSTEM

(71) Applicant: TOYOTA MOTOR ENGINEERING & MANUFACTURING NORTH AMERICA, INC., Plano, TX (US)

(72) Inventor: Varun J. Prabhakar, Saline, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/543,214

(22) Filed: Aug. 16, 2019

(65) Prior Publication Data

US 2021/0051264 A1 Feb. 18, 2021

(51) Int. Cl.
*H04N 5/232* (2006.01)
*B60R 1/12* (2006.01)
*B60R 1/00* (2006.01)
*B60R 11/04* (2006.01)

(52) U.S. Cl.
CPC .......... *H04N 5/23218* (2018.08); *B60R 1/00* (2013.01); *B60R 1/12* (2013.01); *B60R 11/04* (2013.01); *B60R 2001/1215* (2013.01); *B60R 2300/20* (2013.01); *B60R 2300/30* (2013.01)

(58) Field of Classification Search
CPC .. B60R 11/04; B60R 1/12; B60R 1/00; B60R 2300/20; B60R 2300/30; B60R 2001/1215; H04N 5/23218
See application file for complete search history.

(56) References Cited

U.S. PATENT DOCUMENTS

| | | | | |
|---|---|---|---|---|
| 5,793,308 A | * | 8/1998 | Rosinski | B60Q 9/005 340/903 |
| 6,253,135 B1 | * | 6/2001 | Hubacher | E05F 15/695 307/10.1 |
| 6,542,076 B1 | * | 4/2003 | Joao | B60R 25/33 340/539.14 |
| 6,542,077 B2 | * | 4/2003 | Joao | B60R 25/252 340/426.16 |
| 7,348,741 B2 | * | 3/2008 | Minekawa | H01M 10/625 318/268 |
| 7,397,363 B2 | * | 7/2008 | Joao | B60R 25/102 340/539.11 |

(Continued)

FOREIGN PATENT DOCUMENTS

| | | |
|---|---|---|
| CN | 107444272 A | 12/2017 |
| WO | WO 2019056538 A1 | 3/2019 |

*Primary Examiner* — Philip P. Dang
(74) *Attorney, Agent, or Firm* — Haynes and Boone, LLP (57) ABSTRACT

Systems and methods for monitoring a position of a window. A window position monitoring system comprises a display screen, a camera configured to capture an image for display on the display screen, and a controller including a processor and a memory. The memory includes instructions that, when executed by the processor, cause the processor to: determine a position of the window; determine at least one of a camera setting of a camera and a display screen setting of the display screen based on the determined position of the window; capture, using the camera, at least one frame of a video of a real-world environment; and display, on the display screen, based on the at least one of the camera setting and the display screen setting, the at least one frame of the video of the real-world environment.

27 Claims, 7 Drawing Sheets

(56) References Cited

U.S. PATENT DOCUMENTS

| | | | |
|---|---|---|---|
| 7,567,291 B2* | 7/2009 | Bechtel | H04N 5/2353 |
| | | | 348/370 |
| 8,339,526 B2* | 12/2012 | Minikey, Jr. | G02B 27/01 |
| | | | 349/11 |
| 8,948,442 B2* | 2/2015 | Breed | G06K 9/00832 |
| | | | 382/100 |
| 9,207,116 B2 | 12/2015 | Nelson et al. | |
| 9,210,312 B2* | 12/2015 | Sablak | G08B 13/19606 |
| 9,255,435 B2* | 2/2016 | Weidenbacher | E05F 15/695 |
| 9,317,983 B2* | 4/2016 | Ricci | A61B 5/4809 |
| 9,381,860 B2* | 7/2016 | Kim | G06T 11/60 |
| 9,409,549 B2* | 8/2016 | Yopp | B60S 1/023 |
| 9,413,941 B2* | 8/2016 | Bekiares | H04N 5/23203 |
| 9,462,377 B2* | 10/2016 | Lasch | H03G 3/24 |
| 9,598,016 B2* | 3/2017 | Blank | G02B 5/0816 |
| 10,170,111 B2* | 1/2019 | Puranik | G10L 15/24 |
| 10,239,475 B2* | 3/2019 | Barnes, III | G10K 11/178 |
| 10,567,674 B2* | 2/2020 | Kirsch | B60K 35/00 |
| 10,576,809 B2* | 3/2020 | Lota | B60H 1/00742 |
| 10,647,300 B2* | 5/2020 | Shirazi | H04W 8/005 |
| 10,701,304 B2* | 6/2020 | Devendran | F21V 23/0464 |
| 2006/0293570 A1* | 12/2006 | Croghan | G16H 15/00 |
| | | | 600/300 |
| 2007/0080585 A1 | 4/2007 | Lyu | |
| 2008/0234899 A1* | 9/2008 | Breed | B60N 2/0232 |
| | | | 701/47 |
| 2009/0096937 A1* | 4/2009 | Bauer | B60R 1/12 |
| | | | 348/739 |
| 2012/0212613 A1* | 8/2012 | Yamaguchi | B60R 1/00 |
| | | | 348/148 |
| 2013/0021433 A1* | 1/2013 | Belsarkar | H04N 7/181 |
| | | | 348/36 |
| 2014/0309864 A1* | 10/2014 | Ricci | G01C 21/365 |
| | | | 701/36 |
| 2015/0203107 A1* | 7/2015 | Lippman | B60W 30/16 |
| | | | 701/23 |
| 2017/0257560 A1* | 9/2017 | Edpalm | H04N 5/23296 |
| 2018/0018939 A1 | 1/2018 | Choi et al. | |
| 2018/0079360 A1* | 3/2018 | Bischoff | H04N 5/23296 |
| 2018/0126907 A1 | 5/2018 | Jeromin et al. | |
| 2018/0302552 A1* | 10/2018 | Shionoya | H04N 5/23216 |
| 2019/0041849 A1* | 2/2019 | Kida | G05D 1/0055 |
| 2019/0228245 A1* | 7/2019 | Brauer | B64D 11/0015 |
| 2019/0279447 A1* | 9/2019 | Ricci | B60Q 9/00 |
| 2020/0150462 A1* | 5/2020 | Cermak | G02F 1/0121 |

* cited by examiner

WINDOW POSITION MONITORING SYSTEM

FIELD

The present disclosure generally relates to a window position monitoring system and, more particularly, to apparatuses, system, and methods for monitoring a position of a window and adjusting settings of at least one of a camera or a display screen based on the position of the window.

BACKGROUND

A camera utilized as a part of a vehicle driver-assist vision system may be packaged such that at least a portion of the camera is positioned behind a substantially transparent window of the vehicle. To account for the presence of the window in the camera's field of view, the camera may be calibrated for a specific brightness setting, for example. To account for changes in ambient light associated with nighttime or daytime conditions, a light sensor may be incorporated as part of the driver-assist vision system to facilitate adjusting the camera settings in response to the ambient light. In some vehicle applications, the window in the camera's field of view may be moveable such that at least a portion of the camera's field of view no longer includes the window. This intermittent absence of the window from at least a portion of the camera's field of view may result in unsatisfactory camera and display performance because of a lack of correct calibration parameters.

SUMMARY

In one example embodiment, a window position monitoring system comprises a display screen, a camera configured to capture an image for display on the display screen, and a controller including a processor and a memory. The memory includes instructions that, when executed by the processor, cause the processor to: determine a position of the window; determine at least one of a camera setting of the camera and a display screen setting of the display screen based on the determined position of the window; capture, using the camera, at least one frame of a video of a real-world environment; and display, on the display screen, based on the at least one of the camera setting and the display screen setting, the at least one frame of the video of the real-world environment.

In another example embodiment, a method of monitoring a position of a window is provided. The method of monitoring the position of the window comprises: determining a position of the window; determining at least one of a camera setting of a camera and a display screen setting of a display screen based on the determined position of the window; capturing, using the camera, at least one frame of a video of a real-world environment; and displaying, on the display screen, based on the at least one of the camera setting and the display screen setting, the at least one frame of the video of the real-world environment.

In yet another example embodiment, a non-transitory computer-readable medium is provided. The non-transitory computer-readable medium includes one or more instructions corresponding to a window position monitoring application that, when executed by a processor, causes the processor to: determine a position of the window; determine at least one of a camera setting of the camera and a display screen setting of a display screen based on the determined position of the window; capture, using a camera, at least one frame of a video of a real-world environment; and display, on a display screen, based on the at least one of the camera setting and the display screen setting, the at least one frame of the video of the real-world environment.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals, letters, or both in the various examples. This repetition is for the purpose of simplicity and clarity and does not in itself dictate a relationship between the various embodiments and/or configurations discussed.

DETAILED DESCRIPTION

Illustrative embodiments and related methods of the present disclosure are described below as they might be employed in one or more apparatuses, systems, and methods for determining a position of a window of a vehicle and for adjusting at least one of the camera and a display based on the position of the window, and therefore based at least partially on the environmental conditions within the camera's field of view. In the interest of clarity, not all features of an actual implementation or method are described in this specification. It will of course be appreciated that in the development of any such actual embodiment, numerous implementation specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. Further aspects and advantages of the various embodiments and related methods of the disclosure will become apparent from consideration of the following description and drawings.

The example embodiments described below describe apparatuses, systems, and methods for monitoring a position of a window and for adjusting at least one of a camera and a display based on the position of the window and therefore the resulting environmental conditions within the camera's field of view.

The disclosure describes a system, method, and apparatus for determining a position of a window of a vehicle and for adjusting at least one of the camera and a display of an image generated by the camera based on the position of the window and therefore the environmental conditions within the camera's field of view and/or at an aperture of the camera. The apparatus/system includes a display screen, a camera configured to capture an image of an area adjacent to a portion of a vehicle for display on the display screen, and a controller including a processor and a memory including instructions to cause the processor to perform a variety of functions in order to determine a position of a window relative to a camera so that the settings of at least one of the camera and the display screen may be modified to optimally present the images captures by the camera to a user of the vehicle. By determining the position of the window relative to the camera, settings of one or both the camera and the display screen may be modified to account for the presence, lack of presence, or partial presence of the window within the field of view of the camera. For example, these settings may include at least one of a brightness setting, an exposure setting, a night setting, a day setting, a headlamp glare reduction setting, an LED headlamp flicker reduction setting, or a tinted window setting to optimize display of the camera image to the user regardless of the conditions present at the camera. Additionally, the images captured by the camera may be presented in the form of a video on a rear-view mirror, or other display screen, within the vehicle and the display screen may be formatted to include a window position indicator overlaid on the display screen so that the user of the vehicle is able to determine a position of the window relative to an open and a closed position of the window based on the display screen view.

Figure 1:
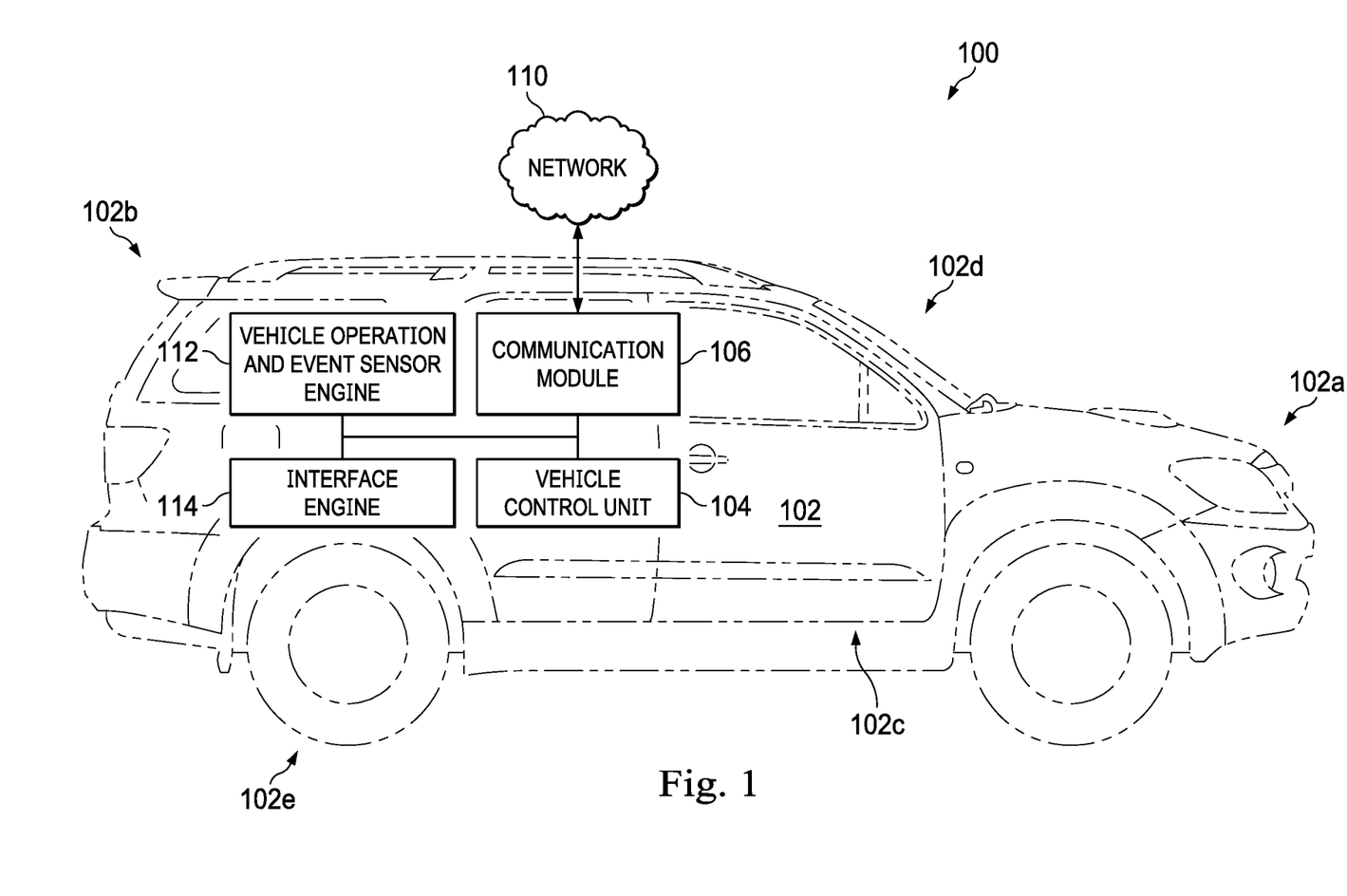
FIG. 1 is a diagrammatic illustration of a window position monitoring system according to one or more embodiments of the present disclosure.

Referring now to the figures, FIG. 1 is an illustration of a window position monitoring system 100 in accordance with an example embodiment. As described herein, the window position monitoring system 100 is arranged to facilitate monitoring of a position of a window to facilitate optimization of a video, which may include a real-time or live video, captured by a camera and displayed to a user by a camera display.

The window position monitoring system 100 includes a vehicle 102, such as an automobile, and a vehicle control unit 104 located on or in the vehicle 102. The vehicle 102 is depicted as an SUV in this illustrative embodiment. However, in other example embodiments, the vehicle 102 may be a van, a multipurpose vehicle, a sedan, or any other type of vehicle. The vehicle 102 may include a front portion 102a (including a front bumper), a rear portion 102b (including a rear bumper and a rear hatch), a right-side portion 102c (including a right front quarter panel, a right front door, a right rear door, and a right rear quarter panel), a left-side portion 102d (including a left front quarter panel, a left front door, a left rear door, and a left rear quarter panel), and wheels 102e. A communication module 106 is operably coupled to, and adapted to be in communication with, the vehicle control unit 104. The communication module 106 may be adapted to communicate wirelessly with an emergency service provider, or any other type of provider or contact, via a network 110 (e.g., a 3G network, a 4G network, a 5G network, a Wi-Fi network, an ad hoc network, or any other type of network that facilitates operation of the communication module 106 as described herein). The network 110 may include one or more off-vehicle servers or processors that perform processing functions for any of the components of the vehicle 102.

A vehicle operation and event sensor engine 112 is operably coupled to, and adapted to be in communication with, the vehicle control unit 104. The vehicle operation and event sensor engine 112 is adapted to monitor various components and parameters of the vehicle 102, for example, engine operating parameters, a speed of the vehicle 102, a direction of the vehicle 102, an outside air temperature, a state of a window of the vehicle 102, among other various components and parameters as will be described in further detail below. An interface engine 114 is operably coupled to, and adapted to be in communication with, the vehicle control unit 104. The interface engine 114 may be configured to output information or data to a vehicle occupant, such as a driver, and receive inputs or information from the vehicle occupant. In addition to, or instead of, being operably coupled to, and adapted to be in communication with, the vehicle control unit 104, the communication module 106, the vehicle operation and event sensor engine 112, and/or the interface engine 114 may be operable coupled to, and adapted to be in communication with, one another via wired and/or wireless communication (e.g., via an in-vehicle network). For example, the wired in-vehicle network may be a CAN bus line or another type of data communications link. In some embodiments, as in FIG. 1, the vehicle control unit 104 is adapted to communication with the communication module 106, the vehicle operation and event sensor engine 112, and the interface engine 114 to at least partially control the interact of data with and between the various components of the window position monitoring system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with the vehicle control unit 104, the communication module 106, the network 110 and any associated server, and/or the emergency service provider 108.

The emergency service provider 108 may be a public or private organization providing emergency response services. For example, the emergency service provider 108 may be first responders such as police, fire, or ambulance responders or other emergency service provider.

Figure 2:
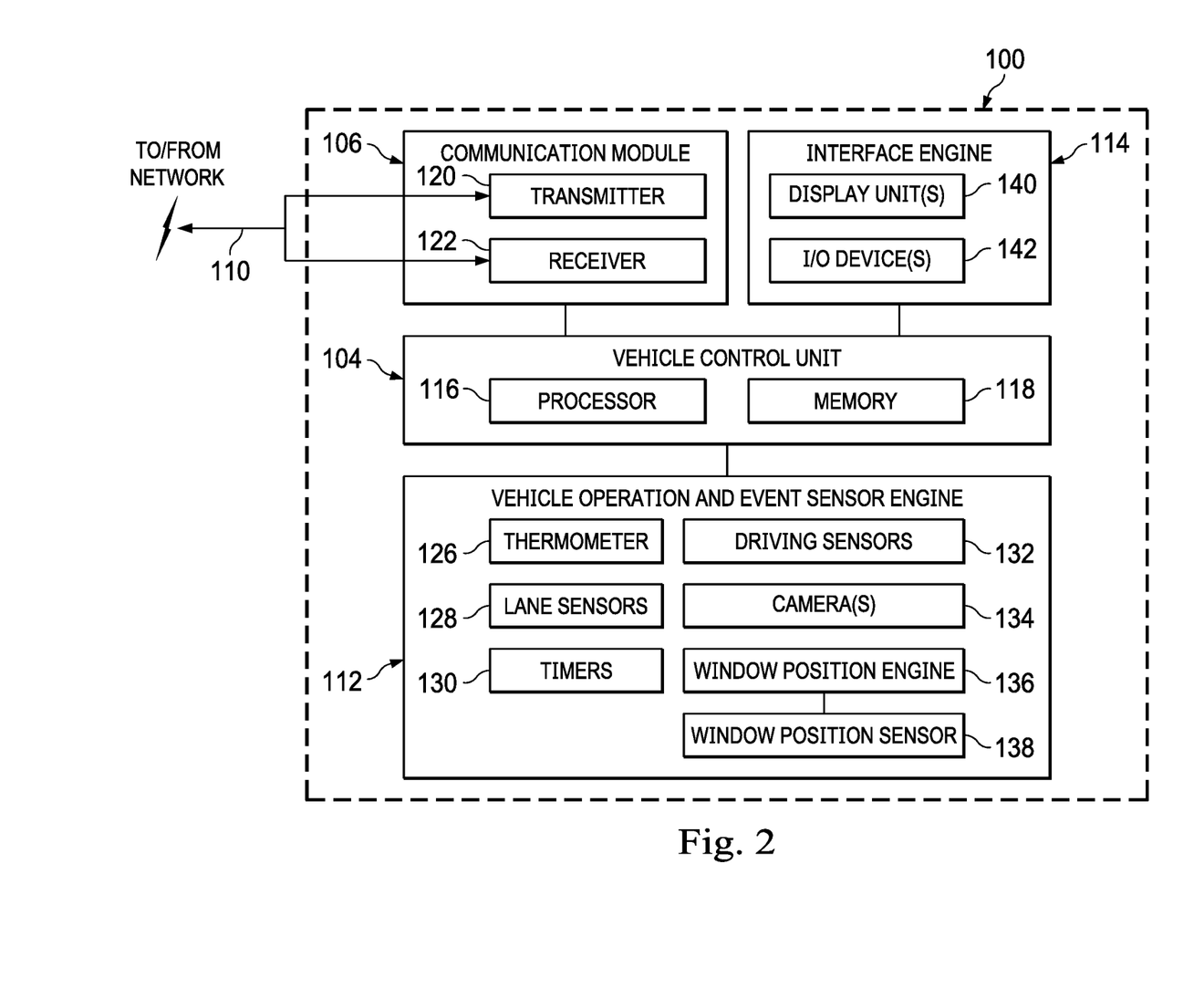
FIG. 2 is a block diagrammatic illustration of the window position monitoring system according to one or more embodiments of the present disclosure.

Referring to FIG. 2, a detailed diagrammatic view of the window position monitoring system 100 of FIG. 1 is illustrated. The vehicle control unit 104 includes a processor 116 and a memory 118. In some implementations, the vehicle control unit 104 processes information from the communication module 106, the vehicle operation and event sensor engine 112, and the interface engine 114. In other implementations, each of the modules and engines includes their own processor and memory that cooperate with the processors and memory of each of the other modules and engines. Accordingly, in some implementations, the vehicle control unit 104 forms a part of any one or more of the described modules or engines.

In some implementations, as in FIG. 2, the communication module 106, which is operably coupled to and adapted to be in communication with the vehicle control unit 104, includes a transmitter 120 and a receiver 122. In some implementations, one or the other of the transmitter 120 and the receiver 122 may be omitted according to the particular application for which the communication module 106 is to be used. In some implementations, the transmitter 120 and the receiver 122 are combined into a transceiver capable of both sending and receiving wireless signals. In any case, the transmitter 120 and the receiver 122 are adapted to send/receive data to/from the network 110.

In some embodiments, as in FIG. 2, the vehicle operation and event sensor engine 112, which is operably coupled to, and adapted to be in communication with, the vehicle control unit 104, includes a plurality of devices configured to facilitate driving and/or operation of the vehicle 102, monitoring of the vehicle 102 and the vehicle components, and monitoring of an internal and external environment of the vehicle 102. In this regard, the vehicle operation and event sensor engine 112 may be designed to exchange communication with the vehicle control unit 104, to not only receive instructions, but to provide information on the operation of the vehicle 102. For example, the vehicle operation and event sensor engine 112 may include vehicle components including, for example, a vehicle battery, a motor (e.g., electric or combustion), a drivetrain, a steering system, and a braking system. The motor drives the wheels 102e of the vehicle 102 via the drivetrain. The vehicle operation and event sensor engine 112 may also include one or more sensors for monitoring any of the vehicle components and/or the internal and/or external vehicle environments. For example, as shown in FIG. 2, the vehicle operation and event sensor engine 112 includes a thermometer 126, drive assist sensors (illustrated as lane sensors 128), timers 130, driving sensors 132 (e.g., proximity sensors, sonar sensors, radar sensors, or any other sensor that facilitates operation of the vehicle 102 by the user), cameras 134 (e.g., rear-view cameras, parking cameras), a window position engine 136, and a window position sensor 138. Additionally, additional sensors (not shown in FIG. 2) may be disposed about the vehicle 102, including sensors associated with monitoring components of the vehicle 102 such as the battery, the motor, the drivetrain, the steering system, and the braking system. The vehicle operation and event sensor engine 112 may include a speedometer, a tachometer, an accelerometer, a global positioning system (GPS), vehicle camera(s), vehicle microphone(s), vehicle impact sensor(s), an airbag sensor, a braking sensor, and other sensors or any combination thereof. The sensors or other detection devices are generally configured to sense or detect activity, conditions, and circumstances in an area to which the device has access.

The window position engine 136 may be configured to communicate with the window position sensor 138 to determine a position of a window of the vehicle 102. More specifically, in this embodiment, the window position engine 136 determines the position of a window, or any number of windows, relative to the camera(s) 134 based on a received signal from the window position sensor 138. In some embodiments, the window position sensor 138 includes at least one of an absolute position sensor, a relative/displacement sensor, a linear sensor, an angular sensor, a proximity sensor, or a multiple axis sensor. In some implementations, the window position engine 136 may determine, based on information from the window position sensor 138, the location of the window relative to the closed position and/or the open position. It may also determine the position of the window relative to aperture of the camera(s) 134. In some implementations, the sensor is a linear encoder that monitors and tracks displacement of the window to determine its location. In other implementations, the sensor is a rotary encoder associated with a window motor that detects the window position based on window motor actuation. Other sensors are contemplated that may directly or indirectly track the position of the window.

The interface engine 114, which is operably coupled to, and adapted to be in communication with, the vehicle control unit 104, includes at least one input and output device or system that enables a user to interact with the vehicle control unit 104 and the functions that the vehicle control unit 104 provides.

In the embodiment shown in FIG. 2, the interface engine 114 includes a display unit 140 and an input/output ("I/O") device 142. The display unit 140 may include any method of conveying information to a user. In some embodiments, the display unit 140 may include a screen or other type of display that may show visual images such as text, illustrations, graphs, or other information relating to the window position monitoring system 100. The display unit 140 may be, include, or be a portion of multiple display units. For example, in some embodiments, the display unit 140 may include one, or any combination, of a central display unit associated with a dash of the vehicle 102, an instrument cluster display unit associated with an instrument cluster of the vehicle 102, a heads-up display unit associated with the dash and a windshield of the vehicle 102, and/or a rear-view mirror coupled to the windshield and/or the roof of the vehicle 102. Accordingly, as used herein, the reference numeral 140 may refer to one, or any combination, of the display units 140. The I/O device 142 may be, include, or be part of a communication port (e.g., a USB port), a Bluetooth communication interface, a touch-screen display unit, soft keys associated with a dash, a steering wheel, a keyboard, buttons, scroll wheels, knobs, dials, witches, voice-activated dialogue, or any other component configured to facilitate a vehicle occupant to input data, inputs, or information into the window position monitoring system 100. Other examples of sub-components that may be part of the interface engine 114 include, but are not limited to, audible alarms, visual alerts, telecommunications equipment, computer-related components, peripherals, and other systems.

Figure 3:
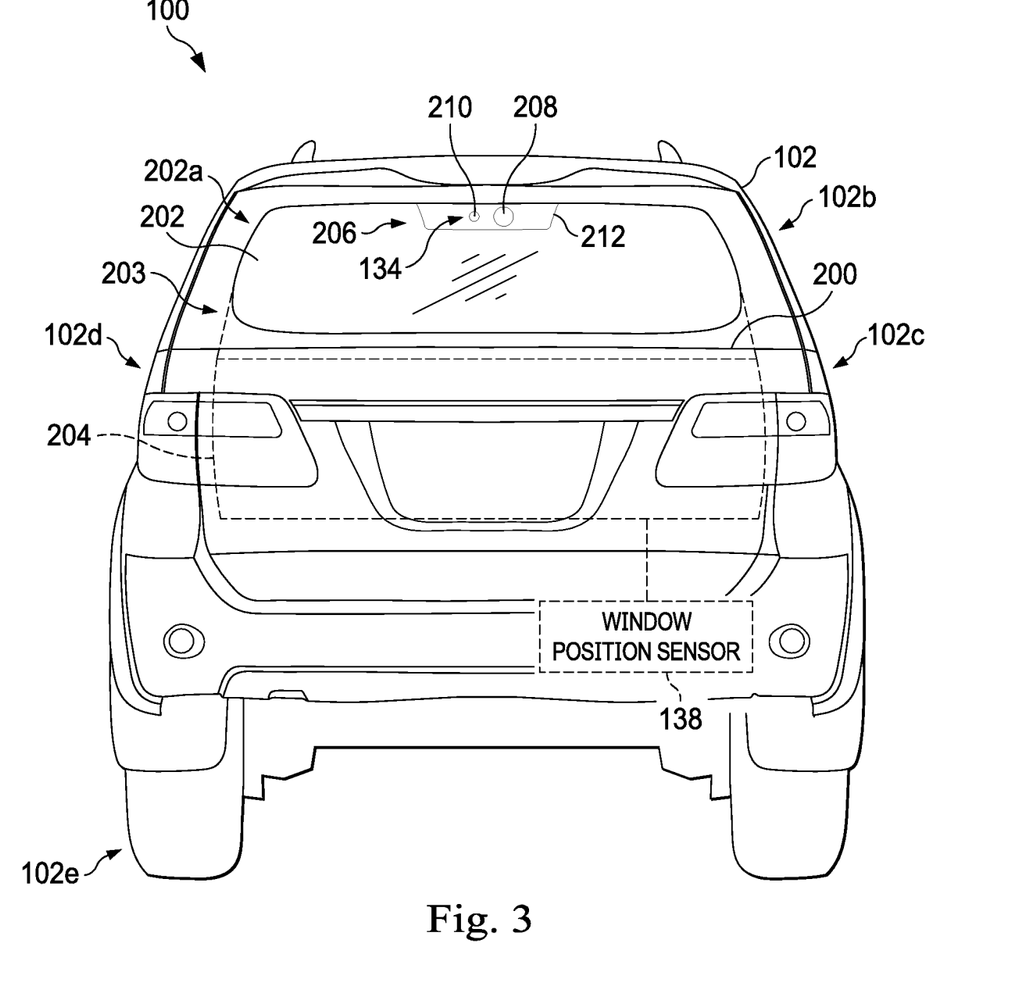
FIG. 3 is a plan view of a rear portion of a vehicle illustrating a window in a closed state according to one or more embodiments of the present disclosure.
Figure 4:
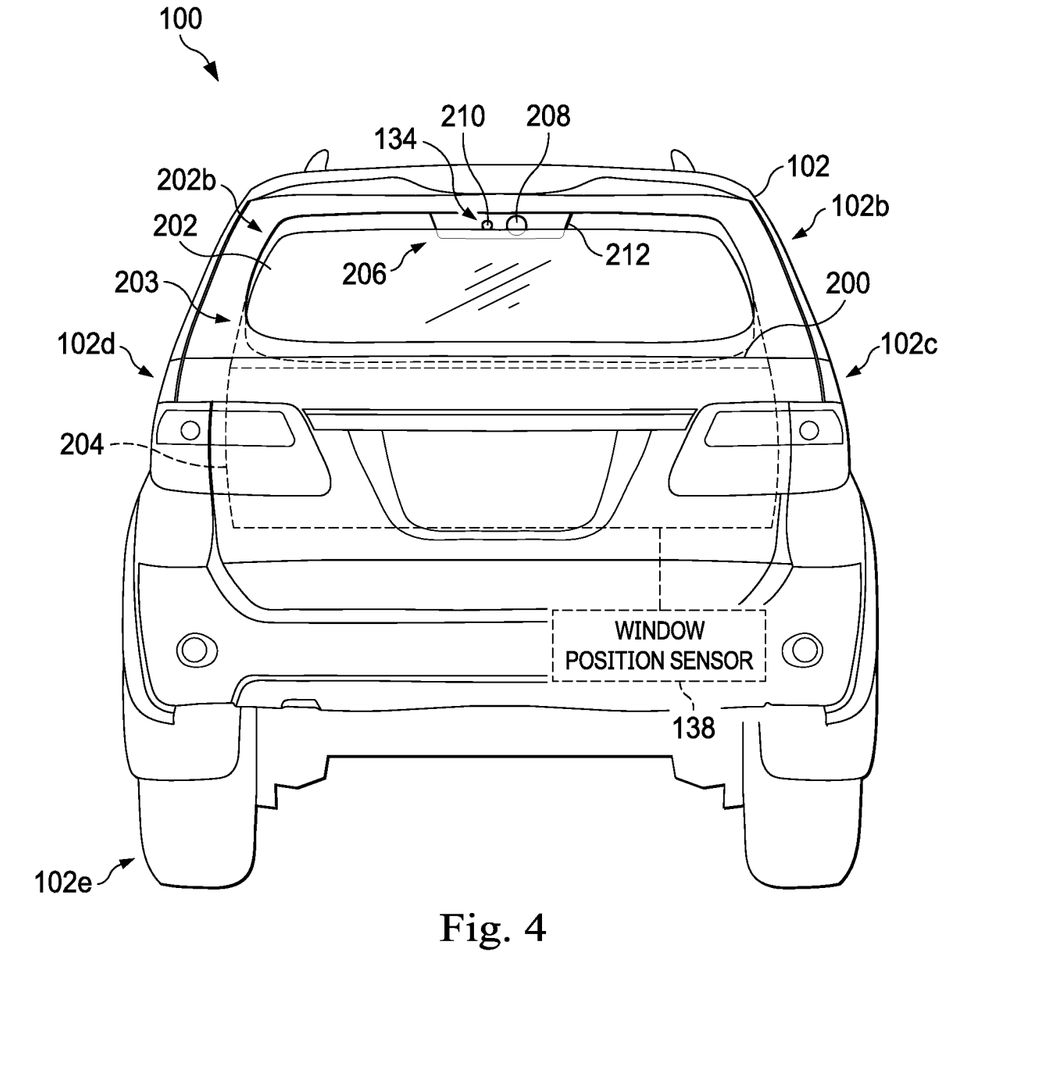
FIG. 4 is a plan view of the rear portion of the vehicle of FIG. 3 illustrating the window in a partially opened state according to one or more embodiments of the present disclosure.
Figure 5:
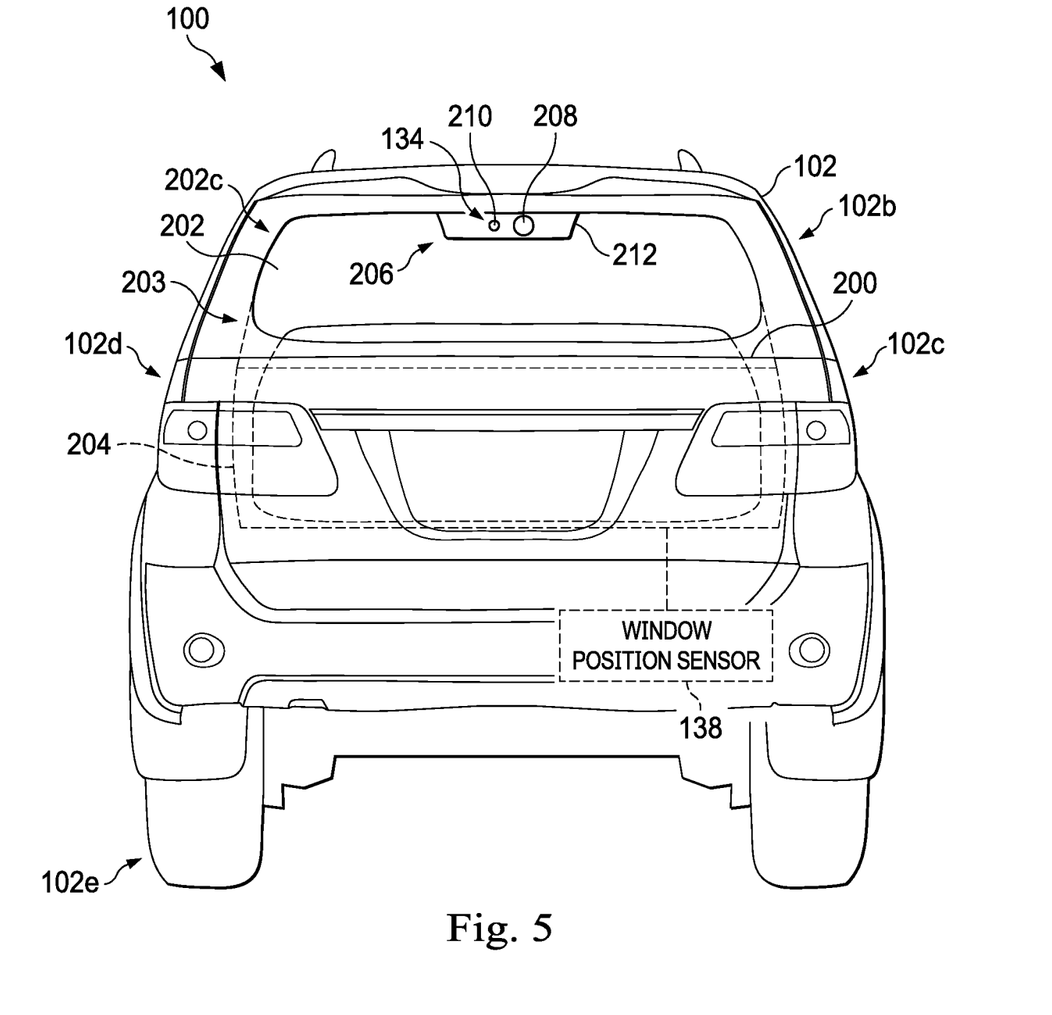
FIG. 5 is a plan view of the rear portion of the vehicle of FIG. 3 illustrating the window in an opened state according to one or more embodiments of the present disclosure.

FIG. 3 illustrates a hatch 200 coupled to the rear portion 102b of the vehicle 102 illustrating a window 202 in a closed state 202a. FIG. 4 illustrates the hatch 200 illustrating the window 202 in a partially opened state 202b. FIG. 5 illustrates the hatch 200 illustrating the window 202 in an opened state 202c. In this embodiment, the window 202 is a sliding glass window configured to translate between the closed state 202a and the opened state 202c, including a plurality of discrete positions between the closed state 202a and the opened state 202c, the plurality of discrete positions corresponding to the partially opened state 202b. In this embodiment, the partially opened states 202b are defined as window positions of window 202 in which at least a portion of the field of view of the camera 208 includes at least a portion of the window 202. In some embodiments, the partially opened states 202b may be defined as window positions of window 202 in which the window is positioned between the closed position 202a and the opened position 202c. In the embodiment shown in FIG. 3, the hatch 200 is coupled to the rear portion 102b of the vehicle 102, is configured to rotate about hinges (not shown) between a closed position and an open position, and includes a through-opening 203 that is substantially covered when the window 202 is in the closed state 202a.

The hatch 200 includes a recess 204 into which the window 202 is at least partially retracted while the window 202 is in the plurality of partially opened states 202b and the opened state 202c. In some embodiments, the window 202 is coupled to a conventional side-entrance door (such as a driver-side door or a passenger-side door) of the vehicle 102 such that the window rotates away from the vehicle 102 between the closed state 202a and the opened state 202c as the side-entrance door pivots about a vertical axis from a closed position to an open position. In some embodiments, the window 202 may slide into side-entrance door between the closed state 202a and the opened state 202c while the side-entrance door is in the closed position. In some other embodiments, the window 202 may be coupled to any portion of the vehicle 102. The window position sensor 138 is positioned within the hatch 200 such that the position of the window 202 with respect to at least one of the opened state 202c, the plurality of partially opened states 202b, the closed state 202a, or the recess 204 may be determined.

As illustrated in FIGS. 3 and 4, the camera 134 includes a camera assembly 206 positioned in an upper portion of the vehicle 102 and includes a camera 208 and a light sensor 210 positioned within a camera assembly housing 212. In this embodiment, the camera 208 is a rear-view camera. In some embodiments, the camera 208 is one of a side-view camera configured to have a field of view that includes at least a portion of an area adjacent to the right-side portion 102c and/or the left-side portion 102d of the vehicle 102, or a dash camera configured to have a field of view that includes at least a portion of an area adjacent to the front portion 102a of the vehicle 102. In this embodiment, the camera assembly housing 212 is coupled to an upper rear portion of a roof of the vehicle 102 such that the camera 208 is positioned to have a field of view directed through the through-opening 203 and that includes an area adjacent to at least a portion of the rear portion 102b of the vehicle 102.

In this embodiment, the light sensor 210 is configured to determine an amount of ambient light present at the aperture of the camera 208. In some embodiments, the light sensor 210 may be positioned distal the camera 208 and may be configured to determine an amount of ambient light present at a location distal the camera 208. In some other embodiments, the camera assembly 206 may not include a light sensor and the camera 208, or another suitable component of the window position monitoring system 100, may determine an amount of ambient light present proximal the aperture of the camera 208.

In this embodiment, the camera 208 is configured to capture at least one frame of a video of an area adjacent to the rear portion 102b of the vehicle 102 and includes a plurality of selectable camera settings. In some embodiments, the camera 208 may be configured to capture a plurality of frames of a video of any duration desired by the user. The plurality of selectable camera settings include at least one of a brightness setting, an exposure setting, a night setting, a day setting, a headlamp glare reduction setting, an LED headlamp flicker reduction setting, or a tinted window setting. The camera settings may be selected by the user of the vehicle 102 and/or the camera settings may be selected and/or continuously modified by the camera 208, the interface engine 114, or the vehicle control unit 104 to facilitate viewing by the user of an area within the field of view of the camera 208.

In this embodiment, the glass of the window 202 is a substantially transparent glass to facilitate viewing of the area adjacent to the rear portion 102b of the vehicle 102 by the camera 208 and to facilitate sensing of ambient light present at the rear portion 102b of the vehicle 102 by the light sensor 210 when the window 202 is in the closed state 202a. In some embodiments, the window 202 is one of a translucent or a partially translucent glass window, for example, a deeply tinted vehicle window. Depending on a position of the window 202 with respect to the vehicle 102, the window 202 may include varying levels of window tint configured to reduce passage of certain wavelengths of light through the window 202. In some embodiments, the portion of the window 202 that includes window tint may have a distinct border with a non-tinted portion of the window, and both portions may overlap at least a portion of the field of view of the camera 208. In some other embodiments, the transparency of the tinted portion of the window 202 may increase along an axis of the window 202.

In this embodiment, the window 202 is configured to move between the closed state 202a and the opened state 202c. In the closed state 202a, the window 202 is positioned between an aperture of the camera 208 and the area adjacent to the rear portion 102b of the vehicle 102, or a real-world environment. In at least a portion of the plurality of positions corresponding to the partially opened state 202b the window 202 is at least partially positioned between the aperture of the camera and the area adjacent to the rear portion 102b of the vehicle 102. Further, in this embodiment, when the window 202 is in the opened state 202c, the aperture of the camera 208 has field of view of the area adjacent to the rear portion 102b of the vehicle 102 that is unobstructed by the window 202. In some embodiments, the aperture of the camera 208 may have a field of view that is at least partially obstructed by the window 202 when the window 202 is in the opened state 202c.

Figure 6:
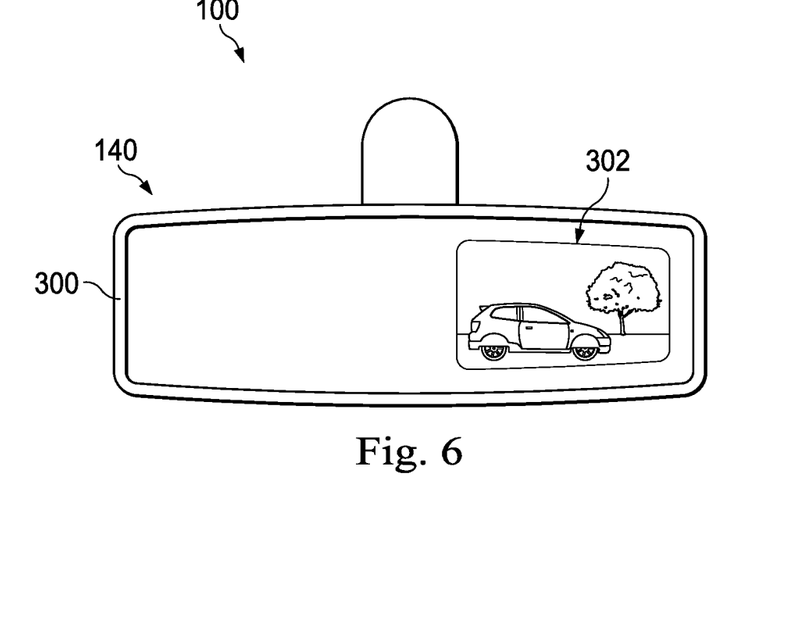
FIG. 6 is a plan view of a rear-view mirror illustrating a rear camera view when the window of FIG. 3 is in the closed state according to one or more embodiments of the present disclosure.
Figure 7:
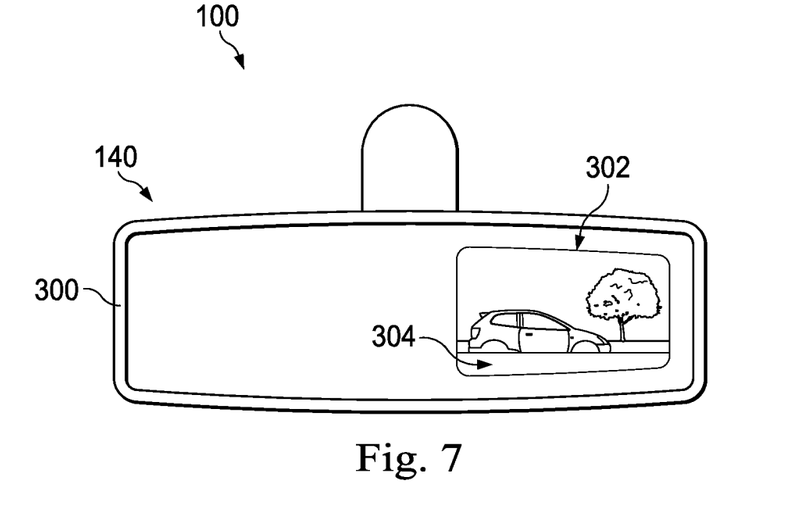
FIG. 7 is a plan view of the rear-view mirror of FIG. 6 illustrating the rear camera view when the window of FIG. 5 is in the opened state according to one or more embodiments of the present disclosure.

FIG. 6 is a plan view of a rear-view mirror 300 illustrating a display unit 140 including a camera display screen 302 corresponding to the field of view of the camera 208 through the window 202, with reference to FIG. 3, when the window 202 is positioned in the closed state 202a. FIG. 7 is a plan view of the rear-view mirror 300 illustrating the camera display screen 302 corresponding to the window 202 in the opened state 202c. In this embodiment, the camera display screen 302 is integrated into the rear-view mirror 300 such that the camera display screen 302 is substantially non-visible to the user of the vehicle 102 during normal operation of the vehicle, and such that once the user has shifted the vehicle into reverse the camera display screen 302 becomes visible to the user. In some embodiments, the camera display screen 302 may be visible to the user at all times during operation of the vehicle 102.

In this embodiment, the camera display screen 302 includes a plurality of selectable display screen settings. The plurality of selectable display screen settings include at least one of a brightness setting, a night setting, a day setting, a headlamp glare reduction setting, or an LED headlamp flicker reduction setting. The display screen settings may be selected by the user of the vehicle 102 using the I/O device 142 (FIG. 2) and/or the display screen settings may be selected and/or continuously modified by the camera display screen 302, the vehicle operation and event sensor engine 112, the interface engine 114, or the vehicle control unit 104 to facilitate viewing by the user of an area within a field of view of the camera 208. In some embodiments, the camera display screen 302 may include any portion of additional display units 140 within the vehicle 102.

In this embodiment, as illustrated in FIG. 7, the camera display screen 302 includes a window position indicator 304 superimposed and/or overlaid on an image from the camera 208 that has been generated on the camera display screen 302. The window position indicator 304 includes a virtual representation of the position of the window 202 relative to the closed position 202c of the window 202. In this embodiment, the window position indicator 304 substantially corresponds with the position of the window 202 relative the closed state 202a and the opened state 202c. The window position indicator 304 may be generated and displayed on the camera display screen 302 by at least one of the window position engine 136, the vehicle operation and event sensor engine 112, the vehicle control unit 104, or the interface engine 114. In some embodiments, the window position indicator 304 may be displayed on other display units 140 or the window position indicator 304 may be an audible or other type of stimuli alert configured to attract the attention of the user.

With reference to FIGS. 6 and 7, based on the determined position of the window 202 relative to the aperture of the camera 208 and at least one of the display screen settings of the camera display screen 302 and the camera settings of the camera 208, at least one frame of the video captured by the camera 208 of the area adjacent to the rear portion 102b of the vehicle 102 is displayed on the camera display screen 302.

Figure 8:
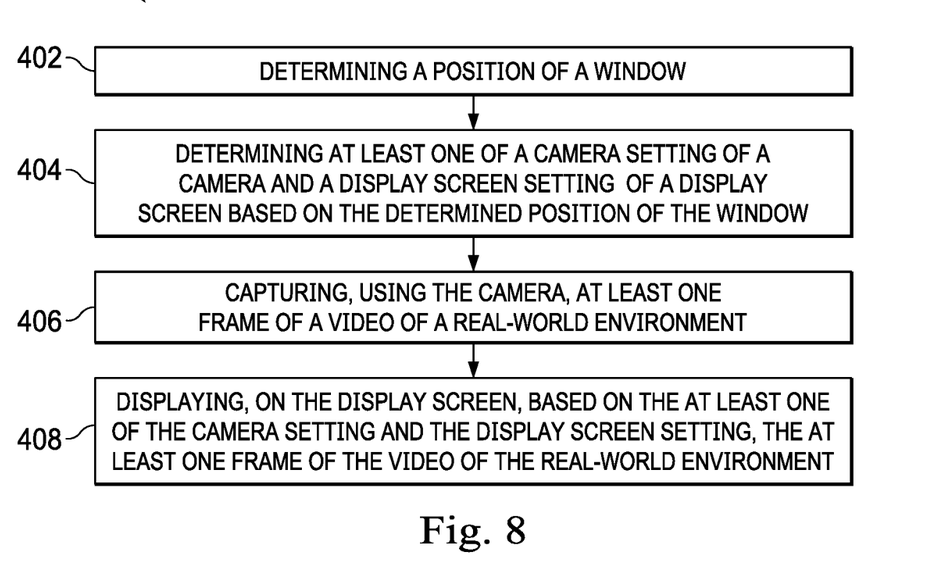
FIG. 8 is a flow diagram of a method of implementing one or more embodiments of the present disclosure.

Referring to FIG. 8, a method of monitoring a camera and a display of an image generated by the camera of window position monitoring system 100 is generally referred to by the reference numeral 400 and is illustrated as a set of operations or steps 402 through 408. Not all of the illustrated steps 402 through 408 may be performed in all embodiments of the method 400. Additionally, one or more steps that are not expressly illustrated in FIG. 8 may be included before, after, in between, or as part of the steps 402 through 408. In some embodiments, one or more of the steps 402 through 408 may be implemented, at least in part, in the form of executable code stored on non-transitory, tangible machine-readable media that when run by one or more processors may cause the one or more processors to perform one or more of the processes. In one or more embodiments, the steps 402 through 408 may be performed by the window position monitoring system 100 of FIG. 1.

The method 400 includes at a step 402, determining a position of a window, such as the window 202. In some embodiments, the step of determining the position of the window may include determining the position of the window relative to a closed position of the window, such as the closed position 202a, relative to an opened position of the window, such as the opened position 202c, relative to a door or hatch of the vehicle, such as the hatch 200, relative to a field of view of a camera, such as the camera 208, and/or relative to an aperture of the camera. In some embodiments, the step 402 may including determining a position of a window relative to an aperture of a camera that is one of a rear-view camera, a side-view camera, and a dash camera.

The method 400 also includes at a step 404, determining at least one of a camera setting of the camera, such as the camera 208, and a display screen setting of a display screen, such as the camera display screen 302, based on the determined position of the window, such as the window 202. In some embodiments, at the step 404, determining the camera setting of the camera may include determining at least one of a brightness setting, an exposure setting, a night setting, a day setting, a headlamp glare reduction setting, an LED headlamp flicker reduction setting, or a tinted window setting. In some other embodiments, at the step 404, determining the display screen setting of the display screen may include determining at least one of a brightness setting, a night setting, a day setting, a headlamp glare reduction setting, or an LED headlamp flicker reduction setting.

In some embodiments, the method 400 may include a step of determining, using a light sensor, such as light sensor 210, an amount of ambient light present at the aperture of the camera, such as camera 208 or camera(s) 134. The method 400 further includes at a step 406, capturing, using the camera, such as the camera 208, at least one frame of a video of a real-world environment, such as the real-world environment including an area adjacent to the rear portion 102b of the vehicle 102.

The method 400 includes at a step 408, displaying, on the display screen, such as the camera display screen 302, based on the at least one of the camera setting and the display screen setting, the at least one frame of the video of the real-world environment, such as the real-world environment surrounding an area adjacent to the rear portion 102b of the vehicle 102. In some embodiments, at the step 408, displaying, on the display screen includes displaying the at least one frame of the video of the real-world environment on at least a portion of a rear-view mirror, such as rear-view mirror 300. In other embodiments, the step 408 may include displaying the at least one frame of the video of the real-world environment on a plurality of display units, such as the display units 140, of an interface engine, such as the interface engine 114. Additionally, in some embodiments, the method 400 may include a step of displaying, on the display screen, such as the camera display screen 302, a window position indicator, such as the window position indicator 304, based on the determined position of the window, such as the window 202.

Figure 9:
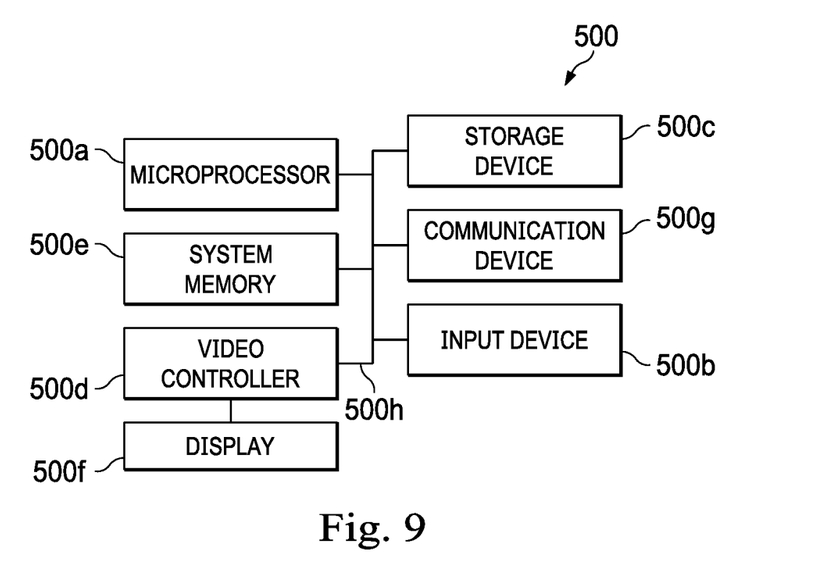
FIG. 9 is a block diagrammatic illustration of a computing node for implementing one or more embodiments of the present disclosure.

Referring to FIG. 9, in an embodiment, a computing node 500 for implementing one or more embodiments of one or more of the above-described elements, the vehicle control unit (e.g., 104), the window position engine (e.g., 136), the window position monitoring system (e.g., 100), the methods (e.g., 400) and/or the steps (e.g., 402, 404, 406 and/or 408), or any combination thereof, is depicted. The node 500 includes a microprocessor 500a, an input device 500b, a storage device 500c, a video controller 500d, a system memory 500e, a display 500f, and a communication device 500g all interconnected by one or more buses 500h. In several embodiments, the storage device 500c may include a floppy drive, hard drive, CD-ROM, optical drive, any other form of storage device or any combination thereof. In several embodiments, the storage device 500c may include, and/or be capable of receiving, a floppy disk, CD-ROM, DVD-ROM, or any other form of computer-readable medium that may contain executable instructions. In several embodiments, the communication device 500*g* may include a modem, network card, or any other device to enable the node 500 to communicate with other nodes. In several embodiments, any node represents a plurality of interconnected (whether by intranet or Internet) computer systems, including without limitation, personal computers, mainframes, PDAs, smartphones and cell phones.

In several embodiments, one or more of the components of any of the above-described systems include at least the node 500 and/or components thereof, and/or one or more nodes that are substantially similar to the node 500 and/or components thereof. In several embodiments, one or more of the above-described components of the node 500 and/or the above-described systems include respective pluralities of same components.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and handheld processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, database may be any standard or proprietary database software. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a computer readable medium may be executed by one or more processors to cause the one or more processors to carry out or implement in whole or in part the above-described operation of each of the above-described elements, the vehicle control unit (e.g., 104), the window position engine (e.g., 136), the window position monitoring system (e.g., 100), the methods (e.g., 400) and/or the steps (e.g., 402, 404, 406 and/or 408), and/or any combination thereof. In several embodiments, such a processor may include one or more of the microprocessor 500*a*, any processor(s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

A window position monitoring system has been disclosed. The window position monitoring system generally includes a display screen, a camera configured to capture an image for display on the display screen, and a controller including a processor and a memory. The memory includes instructions that, when executed by the processor, cause the processor to: determine a position of a window; determine at least one of a camera setting of the camera and a display screen setting of the display screen based on the determined position of the window; capture, using the camera, at least one frame of a video of a real-world environment; and display, on the display screen, based on the at least one of the camera setting and the display screen setting, the at least one frame of the video of the real-world environment.

The foregoing system embodiment may include one or more of the following elements, either alone or in combination with one another:

The window position monitoring system further includes a light sensor configured to determine an amount of ambient light present at the aperture of the camera.

The window position monitoring system further includes a window position sensor and the memory includes further instructions that cause the processor to determine, using the window position sensor, the position of the window relative to one of a field of view of the camera, and aperture of the camera, a closed position of the window, and opened position of the window, or a door of a vehicle.

The display screen includes a portion of a rear-view mirror.

The instructions further include instructions to cause the processor to display, on the display screen, a window position indicator based on the determined position of the window.

The camera is one of a rear-view camera, a side-view camera, and a dash camera.

The window is configured to move between a closed state and an opened state, wherein the window is positioned between the aperture of the camera and the real-world environment in the closed state, and wherein the window is one of positioned such that at least a portion of the window is between the aperture of the camera and the real-world environment and positioned such that the aperture of the camera has an unobstructed field of view of the real-world environment.

The window is one of transparent or at least partially translucent.

The camera setting includes at least one of a brightness setting, an exposure setting, a night setting, a day setting, a headlamp glare reduction setting, or an LED headlamp flicker reduction setting.

A method of monitoring a position of a window has been disclosed. The method of monitoring the position of the window generally includes: determining a position of the window; determining at least one of a camera setting of a camera and a display screen setting of a display screen based on the determined position of the window; capturing, using the camera, at least one frame of a video of a real-world environment; and displaying, on the display screen, based on at least one of the camera setting and display screen setting, the at least one frame of the video of the real-world environment.

The foregoing method embodiment may include one or more of the following elements, either alone or in combination with one another:

Determining, using a light sensor, an amount of ambient light present at the aperture of the camera.

Determining, using a window position sensor, the position of the window relative to one of a field of view of the camera, an aperture of the camera, a closed position of the window, an opened position of the window, or a door of a vehicle.

Displaying, on the display screen, the at least one frame of the video of the real-world environment on at least a portion of a rear-view mirror.

Displaying, on the display screen, a window position indicator based on the determined position of the window.

The camera is one of a rear-view camera, a side-view camera, and a dash camera.

The window is configured to move between a closed state and an opened state, wherein the window is positioned between the aperture of the camera and the real-world environment in the closed state, and wherein the window is one of positioned such that at least a portion of the window is between the aperture of the camera and the real-world environment and positioned such that the aperture of the camera has an unobstructed field of view of the real-world environment.

The window is one of transparent or at least partially translucent.

The camera setting includes at least one of a brightness setting, an exposure setting, a night setting, a day setting, a headlamp glare reduction setting, an LED headlamp flicker reduction setting, or a tinted window setting.

The display screen setting includes at least one of a brightness setting, a night setting, a day setting, a headlamp glare reduction setting, or an LED headlamp flicker reduction setting.

A non-transitory computer-readable medium has been disclosed. The non-transitory computer-readable medium has one or more instructions corresponding to a window position monitoring application that, when executed by a processor, cause the processor to: determine a position of a window; determine at least one of a camera setting of the camera and a display screen setting of a display screen based on the determined position of the window; capture, using a camera, at least one frame of a video of a real-world environment; and display, on a display screen, based on the at least one of the camera setting and the display screen setting, the at least one frame of the video of the real-world environment.

The foregoing non-transitory computer-readable medium embodiment may include one or more of the following elements, either alone or in combination with one another:

Instructions that further cause the processor to determine, using a light sensor, an amount of ambient light present at the aperture of the camera.

Instructions that further cause the processor to determine, using a window position sensor, the position of the window relative to one of a field of view of the camera, an aperture of the camera, a closed position of the window, an opened position of the window, or a door of a vehicle.

Instructions that further cause the processor to display, on the display screen, a window position indicator based on the determined position of the window.

The camera is one of a rear-view camera, a side view camera, and a dash camera.

The window is configured to move between a closed state and an opened state, wherein the window is positioned between the aperture of the camera and the real-world environment in the closed state, and wherein the window is one of positioned such that at least a portion of the window is between the aperture of the camera and the real-world environment and positioned such that the aperture of the camera has an unobstructed field of view of the real-world environment.

The window is one of transparent or at least partially translucent.

The camera setting includes at least one of a brightness setting, an exposure setting, a night setting, a day setting, a headlamp glare reduction setting, an LED headlamp flicker reduction setting, or a tinted window setting.

The display screen setting includes at least one of a brightness setting, a night setting, a day setting, a headlamp glare reduction setting, or an LED headlamp flicker reduction setting.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes, and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although some embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims.

What is claimed is:

1. A window position monitoring system for a vehicle, the window position monitoring system comprising:
    a display screen;
    a camera configured to capture an image for display on the display screen;
    a window position sensor; and
    a controller including a processor and a memory, the memory including instructions that, when executed by the processor, cause the processor to:
        determine a change of a position of a window within a field of view of the camera;
        determine a change in ambient light present proximal an aperture of the camera resulting from the change of the position of the window;
        determine, using the window position sensor, the position of the window relative to one of the field of view of the camera, the aperture of the camera, a closed position of the window, an opened position of the window, or a door of the vehicle;
        modify at least one of a camera setting of the camera and a display screen setting of the display screen based on the determined change of the position of the window and the determined change in the ambient light to account for an absence of the window from at least a portion of the field of view of the camera;
        capture, using the camera, at least one frame of a video of a real-world environment; and
        display, on the display screen, based on the at least one of the camera setting and the display screen setting, the at least one frame of the video of the real-world environment.

2. The window position monitoring system for the vehicle of claim 1, further comprising a light sensor configured to determine an amount of ambient light present at the aperture of the camera.

3. The window position monitoring system for the vehicle of claim 1, wherein the display screen includes a portion of a rear-view mirror.

4. The window position monitoring system for the vehicle of claim 1, wherein the instructions further comprise instructions to cause the processor to:
    display, on the display screen, a window position indicator based on the determined position of the window.

5. The window position monitoring system for the vehicle of claim 1, wherein the camera is one of a rear-view camera, a side-view camera, and a dash camera.

6. The window position monitoring system for the vehicle of claim 1, wherein the window is configured to move between a closed state and an opened state, wherein the window is positioned between the camera and the real-world environment in the closed state, and wherein the window is positioned such that at least a portion of the window is between the camera and the real-world environment or the camera has an unobstructed field of view of the real-world environment.

7. The window position monitoring system for the vehicle of claim 1, wherein the window is transparent or at least partially translucent.

8. The window position monitoring system for the vehicle of claim 1, wherein the camera setting includes at least one of a brightness setting, an exposure setting, a night setting, a day setting, a headlamp glare reduction setting, an LED headlamp flicker reduction setting, or a tinted window setting.

9. The window position monitoring system for the vehicle of claim 1, wherein the display screen setting includes at least one of a brightness setting, a night setting, a day setting, a headlamp glare reduction setting, or an LED headlamp flicker reduction setting.

10. A method of monitoring a position of a window, the method comprising:
    determining a change of the position of the window within a field of view of a camera, wherein determining the position of the window comprises determining, using a window position sensor, the position of the window relative to one of the field of view of the camera, an aperture of the camera, a closed position of the window, an opened position of the window, or a door of a vehicle;
    determining a change in ambient light present proximal the aperture of the camera resulting from the change of the position of the window;
    modifying at least one of a camera setting of the camera and a display screen setting of a display screen based on the determined change of the position of the window and the determined change in the ambient light to account for an absence of the window from at least a portion of the field of view of the camera;
    capturing, using the camera, at least one frame of a video of a real-world environment; and
    displaying, on the display screen, based on the at least one of the camera setting and the display screen setting, the at least one frame of the video of the real-world environment.

11. The method of monitoring the position of the window according to claim 10, further comprising determining, using a light sensor, an amount of ambient light present at the camera.

12. The method of monitoring the position of the window according to claim 10, wherein displaying, on the display screen comprises displaying the at least one frame of the video of the real-world environment on at least a portion of a rear-view mirror.

13. The method of monitoring the position of the window according to claim 10, further comprising displaying, on the display screen, a window position indicator based on the determined position of the window.

14. The method of monitoring the position of the window according to claim 10, wherein the camera is one of a rear-view camera, a side-view camera, and a dash camera.

15. The method of monitoring the position of the window according to claim 10, wherein the window is configured to move between a closed state and an opened state, wherein the window is positioned between the camera and the real-world environment in the closed state, and wherein the window is positioned such that at least a portion of the window is between the camera and the real-world environment or the camera has an unobstructed field of view of the real-world environment.

16. The method of monitoring the position of the window according to claim 10, wherein the window is transparent or at least partially translucent.

17. The method of monitoring the position of the window according to claim 10, wherein the camera setting includes at least one of a brightness setting, an exposure setting, a night setting, a day setting, a headlamp glare reduction setting, an LED headlamp flicker reduction setting, or a tinted window setting.

18. The method of monitoring the position of the window according to claim 10, wherein the display screen setting includes at least one of a brightness setting, a night setting, a day setting, a headlamp glare reduction setting, or an LED headlamp flicker reduction setting.

19. A non-transitory computer-readable medium having one or more instructions corresponding to a window position monitoring application that, when executed by a processor, cause the processor to:
determine a change of a position of a window within a field of view of a camera;
determine a change in ambient light present proximal an aperture of the camera resulting from the change of the position of the window;
determine, using a window position sensor, the position of the window relative to one of the field of view of the camera, the aperture of the camera, a closed position of the window, an opened position of the window, or a door of a vehicle;
modify at least one of a camera setting of the camera and a display screen setting of a display screen based on the determined change of the position of the window and the determined change in the ambient light to account for an absence of the window from at least a portion of the field of view of the camera;
capture, using the camera, at least one frame of a video of a real-world environment; and
display, on the display screen, based on the at least one of the camera setting and the display screen setting, the at least one frame of the video of the real-world environment.

20. The non-transitory computer-readable medium of claim 19, wherein the instructions further comprise instructions to cause the processor to:
determine, using a light sensor, an amount of ambient light present at the camera.

21. The non-transitory computer-readable medium of claim 19, wherein the instructions further comprise instructions to cause the processor to:
display the at least one frame of the video of the real-world environment on at least a portion of a rear-view mirror.

22. The non-transitory computer-readable medium of claim 19, wherein the instructions further comprise instructions to cause the processor to:
display, on the display screen, a window position indicator based on the determined position of the window.

23. The non-transitory computer-readable medium of claim 19, wherein the camera is one of a rear-view camera, a side-view camera, and a dash camera.

24. The non-transitory computer-readable medium of claim 19, wherein the window is configured to move between a closed state and an opened state, wherein the window is positioned between the camera and the real-world environment in the closed state, and wherein the window is positioned such that at least a portion of the window is between the camera and the real-world environment or the camera has an unobstructed field of view of the real-world environment.

25. The non-transitory computer-readable medium of claim 19, wherein the window is transparent or at least partially translucent.

26. The non-transitory computer-readable medium of claim 19, wherein the camera setting includes at least one of a brightness setting, an exposure setting, a night setting, a day setting, a headlamp glare reduction setting, an LED headlamp flicker reduction setting, or a tinted window setting.

27. The non-transitory computer-readable medium of claim 19, wherein the display screen setting includes at least one of a brightness setting, a night setting, a day setting, a headlamp glare reduction setting, or an LED headlamp flicker reduction setting.

* * * * *